United States Patent [19]
Wittmann et al.

[11] Patent Number: 5,679,759
[45] Date of Patent: Oct. 21, 1997

[54] POLYCARBONATE MOULDING MATERIALS WITH IMPROVED TOUGHNESS

[75] Inventors: Dieter Wittmann, Leverkusen; Thomas Eckel, Dormagen; Heinrich Alberts, Odenthal; Herbert Eichenauer; Ulrich Jansen, both of Dormagen, all of Germany

[73] Assignee: Bayer AG, Leverkusen, Germany

[21] Appl. No.: 530,629

[22] Filed: Sep. 20, 1995

[30] Foreign Application Priority Data

Sep. 30, 1994 [DE] Germany ............ 44 34 965.3

[51] Int. Cl.⁶ .................................... C08G 64/00
[52] U.S. Cl. .............. 528/196; 264/176.1; 525/63; 525/69; 525/146; 525/461; 528/198
[58] Field of Search ............... 528/196, 198; 525/63, 69, 146, 461; 264/176.1

[56] References Cited

U.S. PATENT DOCUMENTS 4,879,329  11/1989  Hongo et al. ............... 524/114

FOREIGN PATENT DOCUMENTS

| | | |
|---|---|---|
| 0 062 838 | 10/1982 | European Pat. Off. . |
| 0 111 260 | 6/1984 | European Pat. Off. . |
| 0 2603 559 | 3/1988 | European Pat. Off. . |
| 0 265 907 | 5/1988 | European Pat. Off. . |
| 0 356 979 | 3/1990 | European Pat. Off. . |
| 0 606 558 | 7/1994 | European Pat. Off. . |

OTHER PUBLICATIONS

Orbit Abstract of EP 0 062 838 (Oct. 20, 1982).
Orbit Abstract of EP 0 111 260 (Jun. 20, 1984).
Orbit Abstract of EP 0 260 559 (Mar. 23, 1988).
Orbit Abstract of EP 0 356 979 (Mar. 7, 1990).
Encyclopedia of Polymer Science and Engineering, vol. 11, Second Edition, John Wiley and Sons, p. 659 (1988).

*Primary Examiner*—Terressa Mosley
*Attorney, Agent, or Firm*—Connolly and Hutz

[57] ABSTRACT

Thermoplastic moulding materials containing
A. 15 to 80 parts by weight of a thermoplastic polycarbonate or polyester carbonate, and
B. 4 to 40 parts by weight of a graft polymer of
  B.1 20 to 60 weight % of one or more monomers on
  B.2 40 to 80 weight % of one or more graft bases having glass transition temperatures <0° C., and
C. 16 to 45 parts by weight of a thermoplastic, aromatic vinyl (co)polymer,
wherein the graft base B.2 has an average particle size ($d_{50}$ value) of 0.20 to 0.35 μm and the weight ratio of components B:C is between 2:1 and 1:4.

16 Claims, No Drawings

POLYCARBONATE MOULDING MATERIALS WITH IMPROVED TOUGHNESS

This invention relates to polycarbonate moulding materials which contain defined graft polymers, particularly ABS polymers, and aromatic vinyl copolymers.

The modification of polycarbonates with grafted rubbers in order to improve their low-temperature impact strength has long been known. In practice, SAN-grafted polybutadiene (ABS) is frequently used (see the Kunststoff Handbuch [Plastics Handbook], Volume 3/2, Industrial Polymer Blends, pages 149 et seq., which is a review article covering this field).

Below what is termed the critical temperature of polycarbonate at about +10° C. (the "ductile-brittle transition"; see the Encyclopedia of Polymer Science and Engineering, Vol. 11, Second Edition, 1988, John Wiley & Sons, page 659), impact strength modifiers have to be added if brittle fracture is to be prevented.

Since the impact strength modifier (e.g. ABS graft polymer) contains a proportion of highly crosslinked, particulate elastomer components with a glass transition temperature <0° C., the stiffness and the flowability of PC/ABS moulding materials deteriorate with increasing content of ABS graft polymer. The object of the investigations performed was to develop an elastomeric modifier for polycarbonate moulding materials having a higher efficiency than the known systems.

Moulding materials having improved properties, comprising polycarbonate (optionally in admixture with polyalkylene terephthalate), graft polymer and optionally a copolymer (the maximum mount of which is 15 weight %), are known from EP-A 606 558. The rubber base of the graft polymer according to EP-A 606 558 has a narrow particle size distribution (>50% between 200 and 300 nm).

It has now been found that certain graft polymers, the particle size and degree of grafting of which lie within narrow limits, improve the low temperature impact resistance of PC/ABS moulding materials in a synergistic manner. When the graft polymers according to the present invention are used, the low temperature impact strength even improves, in a manner which is completely unexpected, as the total rubber content of the moulding materials decreases, so that overall a higher stiffness and improved flowability can be obtained with a higher low temperature impact strength. Moreover the moulding materials according to the invention do not exhibit the usual considerable decrease in toughness values from room temperature to low temperatures (−20° C., −40° C.), and their low temperature impact strength and stiffness clearly surpass those of comparable compositions according to EP-A 606 558.

The present invention relates to moulding materials containing

A. 15 to 80 parts by weight, preferably 30 to 70 parts by weight, of a thermoplastic polycarbonate or polyester carbonate, and B. 4 to 40 parts by weight, preferably 10 to 30 parts by weight, of a graft polymer of
   B.1 20 to 60 weight % of one or more monomers on
   B.2 40 to 80 weight % of one or more graft bases having glass transition temperatures <0° C., preferably <−20° C., and C. 16 to 45 parts by weight, preferably 20 to 35 parts by weight, of a thermoplastic, aromatic vinyl (co)polymer, characterised in that the graft base B.2 has an average particle size ($d_{50}$ value) of 0.20 to 0.35 µm, preferably 0.25 to 0.30 µm, and the weight ratio of components B:C is between 2:1 and 1:4, preferably between 1:1 and 1:3.

Component A

Aromatic polycarbonates and/or aromatic polyester carbonates in accordance with component A are known from the literature and can be prepared by methods known from the literature (for example see Schnell "Chemistry and Physics of Polycarbonates", Interscience Publishers, 1964, and also DE-AS 1 495 626, DE-OS 2 232 877, DE-OS 2 703 376, DE-OS 2 714 544, DE-OS 3 000 610 and DE-OS 3 832 396 for the preparation of aromatic polycarbonates; see DE-OS 3 077 934, for example, for the preparation of aromatic polyester carbonates).

Aromatic polycarbonates and/or aromatic polyester carbonates are prepared by the reaction of diphenols with carbonic acid halides, preferably phosgene, and/or with aromatic dicarboxylic acid dihalides, preferably benzene dicarboxylic acid dihalides, by the phase boundary method, optionally with the use of chain terminators, for example monophenols, and optionally with the use of trifunctional branching agents or branching agents of higher functionality, for example triphenols or tetraphenols.

Diphenols for the preparation of aromatic polycarbonates and/or aromatic polyester carbonates are preferably those of formula (I)

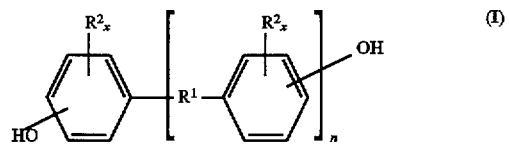

where $R^1$ represents a single bond, a $C_1$–$C_5$ alkylene, a $C_2$–$C_5$ alkylidene, a $C_5$–$C_6$ cycloalkylidene, —O—, —SO—,

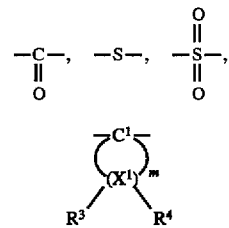

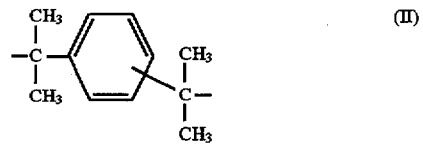

or a radical of formula (II)

$R^2$ represents chlorine or bromine, x is 0, 1 or 2, n is 1 or 0, and $R^3$ and $R^4$ represent hydrogen or a $C_1$–$C_6$ alkyl which are individually selectable for each X1 and are independent of each other, $X^1$ represents carbon, and m is an integer from 4 to 7, preferably 4 or 5.

Preferred diphenols thus comprise hydroquinone, resorcinol, dihydroxydiphenols, bis-(hydroxyphenyl)-$C_1$–$C_5$ alkanes, bis-(hydroxyphenyl)-$C_5$–$C_6$-cycloalkanes, bis-(hydroxyphenyl)-ethers, bis-(hydroxyphenyl) sulphoxides, bis-(hydroxyphenyl)-ketones, bis-(hydroxyphenyl)sulphones and α,α-bis-(hydroxyphenyl)-diisopropylbenzenes, as well as their derivatives having a brominated and/or chlorinated aromatic nucleus.

Particularly preferred diphenols comprise bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulphide, 4,4'-dihydroxydiphenylsulphone and their di- and tetra-brominated or chlorinated derivatives such as 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane, for example.

2,2-bis-(4-hydroxyphenyl)-propane (bisphenol A) is particularly preferred.

The diphenols may be used individually or as arbitrary mixtures.

The diphenols are known from the literature or can be obtained by methods known from the literature.

Examples of suitable chain terminators for the preparation of the thermoplastic aromatic polycarbonates include phenol, p-chlorophenol, p-tert.-butylphenol or 2,4,6-tribromophenol, and also long chain alkylphenols such as 4-(1,3-tetra-methylbutyl)-phenol according to DE-OS 2 842 005, or monoalkylphenol or dialkylphenols having a total of 8 to 20 C atoms in their alkyl substituents, such as 3,5-di-tert.-butylphenol, p-iso-octylphenol, p-tert.-octylphenol, p-dodecylphenol and 2-(3,5-dimethylheptyl)-phenol and 4-(3,5-dimethylheptyl)-phenol. The amount of chain terminators to be used is generally between 0.5 mole % and 10 mole %, based on the total number of moles of the diphenols used in each case.

The thermoplastic, aromatic polycarbonates have weight average molecular weights ($\overline{M}_w$, measured by ultracentrifuging or light-scattering, for example) of 10,000 to 200,000, preferably 20,000 to 80,000.

The thermoplastic, aromatic polycarbonates may be branched in the known manner, preferably by the incorporation of 0.05 to 2.0 mole %, based on the sum of the diphenols used, of trifunctional compounds or compounds having a functionality greater than three, for example those containing three or more than three phenolic groups.

Both polycarbonate homopolymers and polycarbonate copolymers are suitable. 1 to 25 weight %, preferably 2.5 to 25 weight % (based on the total amount of diphenols to be used), of diphenols of formula (III) may also be used for the preparation of polycarbonate copolymers A) according to the invention, Polydiorganosiloxanes containing terminal hydroxyaryloxy groups according to formula (III) are known (see U.S. Pat. No. 3,419,634, for example) or can be prepared by methods known from the literature. The preparation of polycarbonate copolymers containing polydiorganosiloxanes is described in DE-OS 3 334 782, for example.

In addition to bisphenol A polycarbonate homopolymers, preferred polycarbonates include polycarbonate copolymers of bisphenol A with up to 15 mole %, based on the molar sum of diphenols, of the other diphenols which have been cited as preferred or particularly preferred, particularly 2,2-bis(3,5-dibromo-4-hydroxyphenyl)-propane.

Aromatic dicarboxylic acid dihalides for the preparation of the thermoplastic, aromatic polyester carbonates are preferably the diacid chlorides of isophthalic acid, terephthalic acid, diphenyl ether 4,4'-dicarboxylic acid and naphthalene 2,6-dicarboxylic acid.

Mixtures of the diacid dichlorides of isophthalic acid and terephthalic acid in a ratio of 1:20 to 20:1 are particularly preferred.

For the preparation of polyester carbonates, a carbonic acid halide, preferably phosgene, is used in addition as a bifunctional acid derivative.

In addition to the monophenols which have already been cited, suitable chain terminators for the preparation of the aromatic polyester carbonates also comprise their chlorocarbonic acid esters and the acid chlorides of monocarboxylic acids, which may optionally be substituted by $C_1$–$C_{22}$ alkyl groups or by halogen atoms, as well as aliphatic $C_2$–$C_{22}$ monocarboxylic acid chlorides.

The amount of chain terminators is 0.1 to 10 mole % in each case, based on the moles of diphenols in the case of phenolic chain terminators and on the moles of dicarboxylic acid dichlorides in the case of monocarboxylic acid chloride chain terminators.

The aromatic polyester carbonates may also contain incorporated aromatic hydroxycarboxylic acids.

The aromatic polyester carbonates may be linear or may be branched in the known manner (see DE-OS 2 940 024 and DE-OS 3 007 934 in this connection also).

The following may be used as branching agents, for example: tri- or multifunctional carboxylic acid chlorides, such as trimesic acid trichloride, cyanuric acid trichloride, 3,3'- or 4,4'-benzophenone-tetracarboxylic acid tetrachloride chloride, 1,4,5,8-napthalenetetracarboxylic acid tetrachloride or pyromellitic acid tetrachloride, in amounts of 0.01 to 1.0 mole % (based on the dicarboxylic acid dichlorides used), or tri- or multifunctional phenols, such as phloroglucinol, 4,6-dimethyl-2,4,6-tri-(4-hydroxyphenyl)-heptene-2,4,6-dimethyl-2,4-6-tri-(4-hydroxyphenyl)-

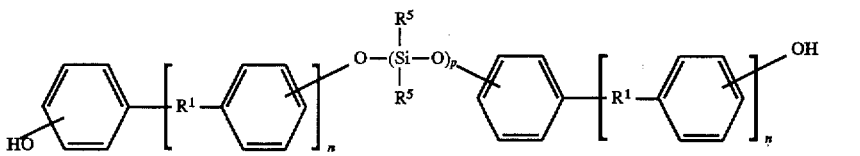

(III)

where $R^1$ has the same meaning as in formula (I), n is 1 or zero, $R^5$ is a linear $C_1$–$C_{20}$ alkyl, a branched $C_3$–$C_{20}$ alkyl or a $C_6$–$C_{20}$ aryl, which may be identical or different, preferably $CH_3$, and p is an integer between 5 and 100, preferably between 20 and 80.

heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxy-phenyl) cyclohexyl]-propane, 2,4-bis(4-hydroxyphenylisopropyl)-phenol, tetra-(4-hydroxyphenyl)-methane, 2,6-bis(2-hydroxy-5-methylbenzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl-benzene, in amounts of 0.01 to 1.0 mole % (based on the diphenols used). Phenolic branching agents may be added to the diphenols; acid chloride branching agents may be employed together with the acid dichlorides.

The proportion of carbonate structural units in the thermoplastic, aromatic polyester carbonates may be arbitrarily varied.

The amount of carbonate groups is preferably up to 100 mole %, particularly up to 80 mole %, most preferably up to 50 mole %, based on the sum of ester groups and carbonate groups.

Both the ester and the carbonate fraction of the aromatic polyester carbonates may be present in the form of blocks, or may be randomly distributed in the condensation polymer.

The relative solution viscosity ($\eta_{rel}$) of the aromatic polyester carbonates falls within the range 1.18 to 1.4, preferably 1.22 to 1.3 (measured on solutions of 0.5 g polyester carbonate in 100 ml $CH_2C_{12}$ solution at 25° C.).

The thermoplastic, aromatic polycarbonates and polyester carbonates may be used alone or in arbitrary admixture with each other.

Component B

Component B comprises one or more graft copolymers of
B.1 20 to 60 parts by weight of one or more monomers on
B.2 40 to 80 parts by weight of one or more graft bases having glass transition temperatures <0° C., preferably <−20° C., characterised in that the graft bases B.2 have an average particle size ($d_{50}$ value) of 0.20 to 0.35 µm, preferably 0.25 to 0.30 µm.

Monomers B.1 are preferably mixtures of

B.1.1 50 to 99 parts by weight of aromatic vinyl compounds and/or aromatic compounds with substituted aromatic nuclei (such as styrene, α-methylstyrene, p-methylstyrene, p-chlorostyrene, for example) and/or methacrylic acid ($C_1$–$C_4$)-alkyl esters, (such as methyl methacrylate or ethyl methacrylate, for example) and B.1.2 1 to 50 parts by weight of vinyl cyanides (unsaturated nitriles such as acrylonitrile and methacrylonitrile) and/or (meth)-acrylic acid ($C_1$–$C_8$)-alkyl esters (such as methyl methacrylate, n-butyl acrylate or t-butyl acrylate, for example) and/or unsaturated carboxylic acids (such as maleic acid) and/or derivatives (such as anhydrides and imides) of unsaturated carboxylic acids (for example maleic anhydride and n-phenyl maleic acid imide).

Preferred monomers B.1.1 are styrene, α-methylstyrene and methyl methacrylate; preferred monomers B.1.2 are acrylonitrile, maleic anhydride and methyl methacrylate.

Particularly preferred monomers are styrene (B.1.1) and acrylonitrile (B.1.2).

Examples of graft bases B.2 which are suitable for graft polymers B. comprise diene rubbers, EP(D)M rubbers, i.e. those based on ethylene/propylene and optionally diene, and acrylate, polyurethane, silicone, chloroprene and ethylene/vinyl acetate rubbers.

Preferred graft bases B.2 are diene rubbers (e.g. those based on butadiene, isoprene, etc.) or mixtures of diene rubbers or copolymers of diene rubbers or their mixtures with other copolymerisable monomers (e.g. in accordance with B.1.1 and B.1.2), with the proviso that the glass transition temperature of component B.2 is below °C.

Pure polybutadiene rubber is particularly preferred.

Examples of particularly preferred polymers B. include ABS polymers (emulsion-, bulk- and suspension-polymerised ABS), as described, for example, in DE-OS 2 035 390 (=U.S. Pat. No. 3,644,574) or in DE-OS 2 248 242 (=GB-PS 1 409 275) or in Ullmann's Enzyklopädie der technischen Chemie [Ullmann's Encyclopedia of Industrial Chemistry], Volume 19 (1980), pages 280 et seq. The gel content of graft base B.2 is at least 30 weight %, preferably at least 40 weight % (measured in toluene), and the average particle diameter $d_{50}$ of graft base B.2 is 0.20 to 0.35 µm, preferably 0.25 to 0.30 µm. Graft copolymers having a rubber base with a larger or smaller average particle diameter $d_{50}$ result in moulding materials which are less favourable as regards the properties attainable according to the present invention.

Graft copolymers B. are produced by radical polymerisation, e.g. by emulsion, suspension, solution or bulk polymerisation, preferably by emulsion polymerisation.

Particularly suitable graft rubbers are ABS polymers which are produced by redox initiation using an initiator system comprising an organic hydroperoxide and ascorbic acid according to U.S. Pat. No. 4,937,285.

Since the graft monomers are not necessarily grafted completely on to the graft base during the grafting reaction, as is known, graft polymers B. according to the invention are also to be understood as comprising those products which are obtained by (co)polymerisation of the graft monomers in the presence of the graft base and which occur conjointly during work-up.

Suitable acrylate rubbers in accordance with B.2 of polymers B. are preferably polymers of acrylic acid alkyl esters, optionally with up to 40 weight %, based on B.2, of other polymerisable, ethylenically unsaturated monomers. The preferred polymerisable, acrylic acid esters comprise $C_1$–$C_8$ alkyl esters, for example methyl, ethyl, butyl, n-octyl and 2-ethylhexyl esters; halogenoalkyl esters, preferably halogeno-$C_1$–$C_8$ alkyl esters such as chloroethyl acrylate, and mixtures of these monomers.

Monomers containing more than one polymerisable double bond can be copolymerised for crosslinking. Preferred examples of crosslinking monomers include esters of unsaturated monocarboxylic acids having 3 to 8 C atoms and unsaturated monohydric alcohols having 3 to 12 C atoms, or saturated polyols having 2 to 4 OH groups and 2 to 20 C atoms, such as ethylene glycol dimethacrylate or allyl methacrylate, for example; multiple-unsaturated heterocyclic compounds, such as trivinyl and triallyl cyanurates, for example; polyfunctional vinyl compounds such as trivinylbenzenes; and also triallyl phosphate and diallyl phthalate. Preferred crosslinking monomers are allyl methacrylate, ethylene glycol dimethacrylate, diallyl phthalate, and heterocyclic compounds which contain at least 3 ethylenically unsaturated groups.

Particularly preferred crosslinking monomers are the cyclic monomers triallyl cyanurate, triallyl isocyanurate, trivinyl cyanurate, triacryloyl hexahydro-s-triazine, and triallylbenzenes. The amount of crosslinking monomers is preferably 0.02 to 5 weight %, particularly 0.05 to 2 weight %, based on graft base B.2.

When cyclic crosslinking monomers having at least 3 ethylenically unsaturated groups are used, it is advantageous if their amount is limited to less than 1 weight of graft base B.2.

Examples of preferred "other" polymerisable, ethylenically unsaturated monomers which may optionally be employed apart from acrylic acid esters for producing the graft base comprise acrylonitrile, styrene, α-methylstyrene, acrylamides, vinyl $C_1$–$C_6$-alkyl ethers, methyl methacrylate and butadiene. Preferred acrylate rubbers for use as graft base B.2 are emulsion polymers which have a gel content of at least 60 weight %.

Other suitable graft bases B.2 are silicone rubbers having graft-active locations, as described in DE-OS 3 704 657, DE-OS 3 704 655, DE-OS 3 631 540 and DE-OS 3 631 539.

The content of component B in the moulding materials should be between 4 and 40 parts by weight, preferably between 10 and 30 parts by weight. With less than 4 parts by weight the modification of the low temperature impact strength of the moulding materials is no longer satisfactory, whilst with more than 40 parts by weight the advantages according to the invention as regards processing capacity and stiffness are lost.

The gel content of graft base B.2 is determined at 25° C. in a suitable solvent (M. Hoffmann, H. Krömer, R. Kuhn, Polymeranalytik [Polymer Analysis] I and II, Georg Thieme-Verlag, Stuttgart 1977).

The average particle size $d_{50}$ is the diameter above and below which 50 weight % of the particles lie in each case. It can be determined by means of ultracentrifuge measurements (W. Scholtan, H. Lange, Kolloid, Z. and Z. Polymere 250 (1972), 782–796).

Component C

Component C comprises one or more thermoplastic, aromatic vinyl (co)polymers.

Suitable (co)polymers C. are those formed from at least one monomer from the group comprising aromatic vinyl compounds, vinyl cyanides (unsaturated nitriles), (meth) acrylic acid ($C_1$–$C_8$) esters, unsaturated carboxylic acids and derivatives (such as anhydrides and iraides) of unsaturated carboxylic acids. Particularly suitable are (co)polymers of C.1 50 to 99 parts by weight of aromatic vinyl compounds and/or aromatic vinyl compounds with substituted aromatic nuclei (such as styrene, α-methylstyrene, p-methylstyrene, p-chlorostyrene, for example) and/or methacrylic acid ($C_1$–$C_4$)-alkyl esters (such as methyl methacrylate or ethyl methacrylate, for example), and C.2 1 to 50 parts by weight of vinyl cyanides (unsaturated nitriles such as acrylonitrile and methacrylonitrile and/or (meth)acrylic acid ($C_1$–$C_8$)-alkyl esters (such as methyl methacrylate, n-butyl acrylate or t-butyl acrylate, for example) and/or unsaturated carboxylic acids (such as maleic acid) and/or derivatives (such as anhydrides and imides) of unsaturated carboxylic acids (for example maleic anhydride and N-phenyl maleic acid imide).

(Co)polymers C. are resin-like, thermoplastic and free from rubber.

The copolymer from styrene (C.1) and acrylonitrile (C.2) is particularly preferred.

(Co)polymers in accordance with C. are known and can be produced by radical polymerisation, particularly by emulsion, suspension, solution or bulk polymerisation. (Co) polymers in accordance with component C. preferably have molecular weights $\overline{M}_W$ (weight average; determined by light scattering or sedimentation) between 15,000 and 200,000.

(Co)polymers according to component C. frequently occur as byproducts in the graft polymerisation of component B., particularly when large amounts of monomers B.1 are grafted on to small amounts of rubber B.2.

The amount of 16 to 45 parts by weight of C to be used according to the invention does not include these byproducts of the graft polymerisation of B.

Added amounts of copolymer C which are larger than 45 parts by weight are undesirable because the low temperature impact strength is then no longer satisfactory. If fewer than 16 parts by weight are added, the favourable combination of stiffness and ease of processing cannot be achieved.

The weight ratio of components B:C should be between 2:1 and 1:4 (preferably between 1:1 and 1:3). B:C ratios higher than 2:1 result in unsatisfactory flowability and decreased stiffness, whilst B:C ratios less than 1:4 result in an unsatisfactory low temperature impact strength.

In addition, the moulding materials according to the invention may contain other known prior art additives in the usual or requisite amounts. The following additives should be cited in this context, without claiming that this is a complete list: stabilisers (e.g. sterically hindered phosphites according to U.S. Pat. No. 4,381,359, and sterically hindered phenols), the usual pigments (carbon black, metal oxides, etc.), demoulding agents (e.g. pentaerithrytol tetrastearate), flow promoters (such as oligomeric polycarbonates in accordance with A having molecular weights between 500 and 10,000), fillers and reinforcing agents (e.g. glass and carbon fibres), flame retardants (e.g. the organic phosphates of EP 0 345 522 and EP 0 363 608), drip preventers (e.g. tetrafluoroethylene polymers, polyphenylene oxide) and antistatic agents (e.g. those based on polyalkyl ethers according to U.S. Pat. Nos. 4,883,835 and 4,920,166, as well as alkali salts of alkanesulphonic acids).

The moulding materials according to the invention may be produced by mixing the constituents at high temperatures, preferably at 200° to 350° C., in the known manner, by compounding or extruding the melt in customary devices such as internal kneaders, extruders, or double shaft screw mixers. The moulding materials according to the invention may be used for producing mouldings of all types, e.g. by injection moulding or by extrusion blow-moulding. Examples of mouldings include: housing parts (e.g. for domestic appliances such as juice presses, coffee machines, mixers), cladding sheets for the building trade, and particularly automobile parts. In addition they are used for electrical appliances, e.g. for plug-in connector strips, because they have very good electrical properties.

Mouldings may also be produced from prefabricated sheets or films by negative thermoforming.

The present invention therefore also relates to the use of the moulding materials described above for the production of mouldings.

EXAMPLES

1. Components used

Parts are given in parts by weight.

Component A

A linear polycarbonate based on bisphenol A, having a relative solution viscosity $\eta_{rel}$=1.28, measured in methylene chloride at 25° C. and at a concentration of 0.5 g/100 ml.

Component B

Graft polymer B was produced by emulsion polymerisation of the graft monomers (a mixture of styrene/ acrylonitrile with a weight ratio of 73:27 was used in all cases) in the presence of an emulsion of the polybutadiene graft base (which was prepared by the usual methods), with a redox activator system comprising cumene hydroperoxide and ascorbic acid (prepared analogously to Example B.1 of DE-OS 3 738 143) and subsequent activation with potassium persulphate. The composition and characterisation are given in Table 1.

TABLE 1

Composition of graft polymers B (B.I to B.IV)

| Graft polymer (B) | Graft base (B.2) | | Graft layer (B.1) |
|---|---|---|---|
| | [parts by weight] | $d_{50}$ value | [parts by weight] |
| B.I (comparison) | 60 | 0.10 | 40 |
| B.II (comparison) | 60 | 0.40 | 40 |
| B.III (according to the | 60 | 0.28 | 40 |

TABLE 1-continued

Composition of graft polymers B (B.I to B.IV)

| Graft polymer (B) | Graft base (B.2) [parts by weight] | $d_{50}$ value | Graft layer (B.1) [parts by weight] |
|---|---|---|---|
| invention) | | | |
| B.IV (comparison) | 70 | 0.10 | 30 |
| B.V (comparison) | 70 | 0.40 | 30 |
| B.VI (according to the invention) | 70 | 0.28 | 30 |

Component C

A styrene/acrylonitrile copolymer having a styrene/acrylonitrile weight ratio of 72:28 and a limit viscosity of $[\eta]=0.55$ dl/g (measured in dimethylformamide at 20° C.).

2. Preparation and testing of the moulding materials according to the invention

Components A, B and C were melted and homogenised in a 3.5 liter internal kneader at temperatures between 210° and 250° C.

The viscosity function of the granular material produced in this manner (melt viscosity as a function of shear rate within the range 20 $s^{-1}$ to 10,000 $s^{-1}$) was measured at 260° C. The viscosity value at 1000 $s^{-1}$ was taken as the relevant quantity for injection moulding processing.

The lower the value of $\eta$ (Pa.s), the better the flowability.

Bars of dimensions 80×10×4 $mm^3$ were produced from the moulding materials in an injection moulding machine (processing temperature 260° C.). The notched bar impact strength of the bars was measured at room temperature, at −20° C. and at −40° C. (the latter only when ductile fracture behaviour was still exhibited at −20° C.) in accordance with the ISO method 180 1A.

The modulus of elasticity in bending of the aforementioned test bars was determined according to DIN 53 452.

The compositions and properties of the moulding materials (Examples 1 to 12) are given in Table 2 below.

In Table 2 the groups comprising the example/comparison examples are composed of groups of three, with the same type of graft polymer (rubber content) but with different average particle diameters of the moulding material base. The moulding materials of examples 1 to 6 each contained 11 weight % of graft base B.2.

It can be seen that the moulding materials of example 3 (based on graft base B.2 with a $d_{50}$ value within the range according to the invention) surpass those of comparison examples 1 (lower $d_{50}$ value) and 2 (higher $d_{50}$ value) in terms of low temperature impact strength, flowability and stiffness. The same applies to example 6 compared with comparison examples 4 and 5. Whereas examples 3 and 6 according to the invention retain their level of toughness down to −40° C., the values for comparison examples 1, 2 and 4, 5 decrease considerably even at −20° C. The moulding materials of examples 7 to 9 contained 7.4 weight % of graft base B.2, whilst those of the series of examples 10 to 12 each contained 8.2 weight %. Even at these compositions, which comprise a reduced rubber content, examples 9 (and 12) according to the invention surpass comparison examples 7 and 8 (and 10 and 11, respectively) in terms of their low temperature impact strength, flowability and stiffness. An examination of the two examples 6 and 12 according to the invention which are based on different amounts of the same graft polymer shows that despite a decrease in total rubber content (from 11 to 8.2 weight % in the moulding material), the impact strength value at −20° C. for example 12, which has a reduced rubber content, is higher than that of example 6. In contrast, the usual behaviour is found in the comparison examples: as the rubber content in the moulding materials decreases either the low temperature impact strength value at −20° C. exhibits a significant decrease (examples 5 and 11) or brittle fractures occur which reduce the value of the moulding materials in use (examples 4 and 10).

We claim:

1. Thermoplastic molding material containing
   A. 15 to 80 parts by weight of thermoplastic polycarbonate or polyester carbonate, and
   B. 4 to 40 parts by weight of a graft polymer of
      B.1 20 to 60 weight % of one or more monomers grafted onto
      B.2 40 to 80 weight % of one or more graft bases having glass transition temperatures <0° C., and

TABLE 2

Properties of moulding materials
(all samples contained 60 parts by weight of polycarbonate A)

| Blend example | Graft polymer B | | Copolymer C | Notched bar impact strength ISO 180 1A [kJ/m²] | | | Flowability at 1 000 s⁻¹ | Modulus of elasticity in bending |
| | Type | [parts by weight] | [parts by weight] | R.T. | −20° C. | −40° C. | [Pa × s] | DIN 53 452 [MPa] |
|---|---|---|---|---|---|---|---|---|
| 1 (comparison) | B.I | 18.3 | 21.7 | 51 z | 40 z | 36 z/s | 307 | 2 100 |
| 2 (comparison) | B.II | 18.3 | 21.7 | 53 z | 42 z | 31 z/s | 259 | 2 150 |
| 3 | B.III | 18.3 | 21.7 | 49 z | 49 z | 50 z | 253 | 2 170 |
| 4 (comparison) | B.IV | 15.7 | 24.3 | 50 z | 40 z | 21 s | 276 | 2 090 |
| 5 (comparison) | B.V | 15.7 | 24.3 | 57 z | 45 z | 29 z/s | 252 | 2 150 |
| 6 | B.VI | 15.7 | 24.3 | 65 z | 67 z | 61 z | 240 | 2 180 |
| 7 (comparison) | B.I | 12.3 | 27.7 | 57 z | 42 z | 19 s | 234 | 2 330 |
| 8 (comparison) | B.II | 12.3 | 27.7 | 61 z | 26 z/s | 16 s | 218 | 2 390 |
| 9 | B.III | 12.3 | 27.7 | 50 z | 50 z | 19 s | 204 | 2 400 |
| 10 (comparison) | B.IV | 11.7 | 28.3 | 69 z | 40 z/s | 18 s | 232 | 2 310 |
| 11 (comparison) | B.V | 11.7 | 28.3 | 108 z | 15 s | — | 222 | 2 300 |
| 12 | B.VI | 11.7 | 28.3 | 64 z | 72 z | 21 s | 214 | 2 360 |

Fracture properties
z: ductile
s: brittle
z/s: ductile/brittle.

C. 16 to 45 parts by weight of a thermoplastic, aromatic vinyl (co)polymer, characterised in that the graft base B.2 has an average particle size ($d_{50}$ value) of 0.20 to 0.35 μm and the weight ratio of components B:C is between 2:1 and 1:4.

2. Thermoplastic molding material according to claim 1, characterised in that the molding material contains 30 to 70 parts by weight of component A, 10 to 30 parts by weight of component B, and 20 to 45 parts by weight of component C.

3. Thermoplastic molding material according to claim 1, characterised in that the glass transition temperature of component B.2 is <−20° C. and its average particle diameter $d_{50}$ is 0.25 to 0.30 μm.

4. Thermoplastic molding material according to claim 1, characterised in that the weight ratio of components B:C is between 1:1 and 1:3.

5. Thermoplastic molding material according to claim 1, characterised in that component A is a polycarbonate based on bisphenol A.

6. Thermoplastic molding material according to claim 1, characterised in that component B is a rubber-modified polymer produced by the graft polymerisation of monomer mixtures comprising B.1.1 50 to 99 parts by weight of aromatic vinyl compounds and/or aromatic compounds with substituted aromatic nuclei and/or methacrylic acid ($C_1$–$C_4$)-alkyl esters, and B.1.2 1 to 50 parts by weight of vinyl cyanides and/or (meth)-acrylic acid ($C_1$–$C_8$)-alkyl esters and/or unsaturated carboxylic acids and/or derivatives of unsaturated carboxylic acids, in the presence of graft base B.2.

7. Thermoplastic molding material according to claim 1, characterised in that component C is a (co)polymer produced from C.1 50 to 99 parts by weight of aromatic vinyl compounds and/or aromatic compounds with substituted aromatic nuclei and/or methacrylic acid ($C_1$–$C_4$)-alkyl esters, and C.2 1 to 50 parts by weight of vinyl cyanides and/or (meth)-acrylic acid ($C_1$–$C_8$)-alkyl esters and/or unsaturated carboxylic acids and/or derivatives of unsaturated carboxylic acids.

8. Thermoplastic molding material according to claim 1, characterised in that component B.2 is a polybutadiene rubber.

9. Thermoplastic molding material according to claim 1, characterised in that the molding material contains at least one additive selected from the group consisting of stabilisers, pigments, demolding agents, flow promoters, fillers and reinforcing agents, flame retardants and antistatic agents.

10. A method of using the molding material according to claim 1, wherein the molding material is injected or extruded to form a molding.

11. Thermoplastic molding material according to claim 1, wherein component B is an ABS polymer.

12. Thermoplastic molding material containing

A. 15 to 80 parts by weight of thermoplastic polycarbonate or polyester carbonate, and B. 4 to 40 parts by weight of a graft polymer of
B.1 20 to 60 weight % of one or more monomers that have been polymerized in the presence of
B.2 40 to 80 weight % of one or more graft bases having glass transition temperatures <0° C., and C. 16 to 45 parts by weight of a thermoplastic, aromatic vinyl (co)polymer, characterised in that the graft base B.2 has an average particle size ($d_{50}$ value) of 0.20 to 0.35 μm and the weight ratio of components B:C is between 2:1 and 1:4.

13. Thermoplastic molding material containing

A. 15 to 70 parts by weight of thermoplastic polycarbonate or polyester carbonate, and B. 10 to 40 parts by weight of a graft polymer of
B.1 20 to 60 weight % of one or more monomers grafted onto
B.2 40 to 80 weight % of one or more graft bases having glass transition temperatures <0° C., and C. 20 to 45 parts by weight of a thermoplastic, aromatic vinyl (co)polymer, characterised in that the graft base B.2 has an average particle size ($d_{50}$ value) of 0.20 to 0.35 μm and the weight ratio of components B:C is between 2:1 and 1:4.

14. Thermoplastic molding material according to claim 13, characterised in that the molding material contains 30 to 70 parts by weight of component A, 10 to 30 parts by weight of component B, and 20 to 45 parts by weight of component C.

15. Thermoplastic molding material according to claim 1, characterised in that the molding material contains 60 to 70 parts by weight of component A, 10 to 18.3 parts by weight of component B, and 20 to 28.3 parts by weight of component C.

16. Thermoplastic molding material according to claim 13, characterised in that the molding material contains 60 to 70 parts by weight of component A, 10 to 18.3 parts by weight of component B, and 20 to 28.3 parts by weight of component C.

* * * * *